DETECTED BOOST VOLTAGE SUPPLY

Filed Oct. 9, 1967

WITNESSES:
Bernard R. Giegucz
James F. Young

INVENTOR
Richard G. Popovich
BY Samuel Ott
ATTORNEY

United States Patent Office

3,480,825
Patented Nov. 25, 1969

3,480,825

DETECTED BOOST VOLTAGE SUPPLY

Richard G. Popovich, Middletown, N.J., assignor to Westinghouse Electric Corporation, Pittsburgh, Pa., a corporation of Pennsylvania

Filed Oct. 9, 1967, Ser. No. 673,674
Int. Cl. H01j *29/70*
U.S. Cl. 315—22 7 Claims

ABSTRACT OF THE DISCLOSURE

The present disclosure relates to power supply circuitry for developing a detected boost operating voltage for use in color television receiver. The operating voltage is derived by peak detecting, via a rectifying device and a capacitor, a voltage waveform appearing at the low voltage end of or at a tap point on the high voltage transformer, with the detected operating voltage appearing across the capacitor which has one end grounded. The detected voltage is filtered and may then be applied to the screen grid electrodes of color picture tube of the receiver.

Background of the invention

The present invention relates to power supply circuitry and, more particularly, to power supply circuitry for developing a high value operating voltage for use in a color television receiver.

In color television receivers it is usually necessary that a direct voltage be provided having a value somewhat higher than the normally developed boost B+ voltage. This higher value voltage is required to supply the screen grid electrode of the color picture tube and is commonly termed the augmented boost voltage or the boosted boost voltage. This voltage is typically several hundred volts higher than the boost voltage. The boost voltage in a color television receiver is commonly developed in the horizontal deflection system by connecting a boost capacitor between B+ and the low voltage end of the high voltage transformer. The boost B+ voltage is developed at the low voltage end of the high voltage transformer which may be approximately three times the magnitude of the B+ potential. A common method of augmenting the boosted voltage at the low voltage end of the high voltage transformer is to provide a tap on the high voltage transformer which supplies a voltage several hundred volts higher than the boost voltage during the flyback portion of the horizontal scanning cycle. The flyback pulse appearing at the tap with respect to the boost voltage at the low voltage end of the high voltage transformer is detected and filtered to supply an augmented boost voltage which may be utilized to supply the screen grid controls for the color picture tube. To detect the flyback pulse a diode is connected between the tap and one end of an input filter capacitor. The other end of the filter capacitor is returned to the low voltage end of the high voltage transformer. Due to the addition of the flyback pulse voltage and the boost voltage, an augmented boost voltage appears at the junction of the diode and the capacitor and after filtering may be supplied to the screen grid controls of the receiver. A serious disadvantage of the use of this type of circuit, aside from the requirement for an additional tap on the high voltage transformer, is that the boosted boost voltage must be heavily filtered to reduce the ripple content thereof before becoming suitable for application to screen grid controls. The heavy filtering is required because of the presence of the 15,750 Hz. waveform appearing across the boost capacitor connected between the low voltage end of the high voltage transformer and the B+ source. This waveform is typically parabolic and has a peak-to-peak magnitude of approximately 200 volts, while the flyback pulse developed between the low voltage end of the high voltage transformer and the tap may have a magnitude of approximately 250 volts. The necessity of eliminating the parabolic waveshape by filtering may reduce the magnitude of the boosted voltage by approximately 100 volts for application to the screen grid controls. Additionally, since the diode connected to the tap conducts only for a very short period of time during the peak of the flyback pulse, it must conduct a relatively high peak current for a very short interval of time to supply the necessary energy for the boosted boost circuit. It thus becomes more difficult to filter the augmented voltage to provide a low ripple supply to the screen grid controls.

Summary of the invention

It is therefore an object of the present invention to provide new and improved boosted boost power supply circuitry.

It is a further object of the present invention to provide new and improved boosted boost power supply circuitry not requiring a separate tap on high voltage transformers and providing a low ripple content voltage without the need for a large amount of filtering.

Broadly, the present invention provides power supply circuitry for developing an enhanced operating voltage for use in a television receiver wherein the enhanced voltage is derived by peak detecting a voltage waveform appearing in the high voltage transformer and filtering the detected voltage to supply a filtered enhanced operating voltage for use in the television receiver.

Description of the preferred embodiments

Figures 1, 2:
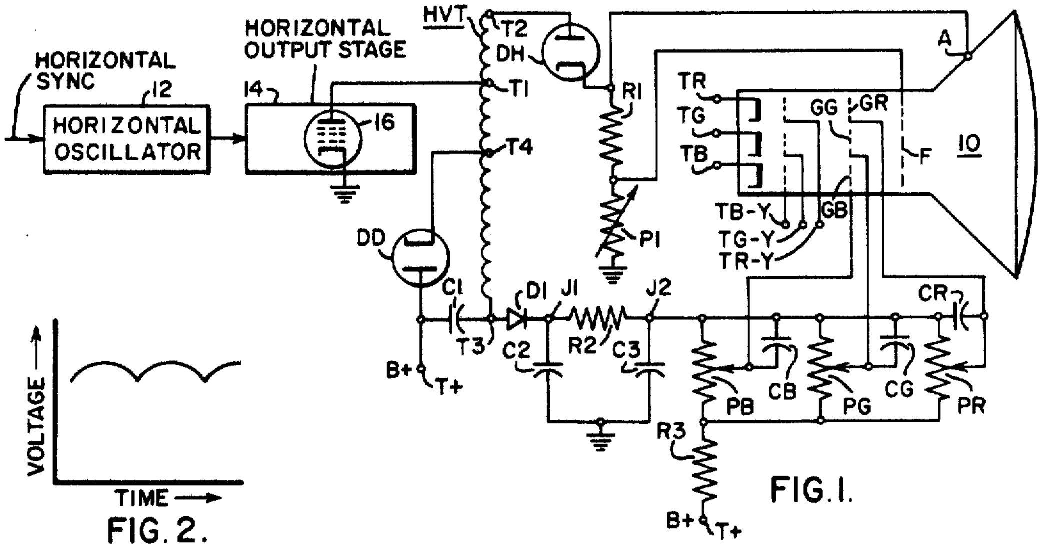
FIGURE 1 is a schematic diagram showing a first embodiment of the power supply circuitry of the present invention.
FIG. 2 is a waveform diagram used in explaining the operation of the circuitry of FIG. 1.

Referring to FIG. 1, the enhanced boost voltage generating circuitry of the present invention is shown incorporated into a color television receiver. Only the pertinent portions of the receiver are shown to emphasize the particular arrangement of the present invention. The receiver may otherwise utilize standard color television circuitry.

A color picture tube 10 is shown schematically including red, green and blue cathode electrodes which are supplied, respectively, by terminals TR, TG and TB. The terminals TR, TG and TB are supplied with luminance signals provided in a color television receiver as is well known. Picture tube 10 includes red, green and blue control grids, respectively, supplied via terminals TR–Y, TG–Y and TB–Y with color difference signals from color difference generating circuitry within the color television receiver. Picture tube 10 also includes screen grid electrodes GR, GG and GB respectively, associated with the red, green and blue guns of the picture tube. A focusing grid F and anode A also are provided within the tube 10 as well known within the art.

The various operating potentials required for screen grid electrodes GR, GG and GB, the focusing electrode F and anode electrode A are developed in the circuitry now to be described.

The horizontal deflection system as shown includes a horizontal oscillator 12 which is supplied with horizontal synchronizing pulses. The horizontal oscillator 12 in turn supplies a horizontal output stage 14 which includes a horizontal output tube 16. The output of the horizontal output tube 16 is connected to an input terminal T1 of the high voltage transformer HVT. The terminal T1 is connected at a point between the high voltage end of the transformer at a terminal T2 and the low voltage end at a terminal T3. A damper diode DD is connected with its anode electrode to a terminal T+ to which a source of B+ potential is connected. For example, the B+ potential connected at the terminal T+ may have a value of approximately 280 volts DC. The cathode electrode at the damper diode DD is connected to a terminal T4 on the high voltage transformer HVT at a point between the terminals T1 and T3. A boost capacitor C1 is connected between the terminal T+ and the low voltage end T3 of the transformer HVT.

As is well known a sawtooth waveform is generated in the horizontal output stage which acts as the horizontal deflection current for the television receiver. To generate the sawtooth waveform the horizontal output tube 16 and the damper diode DD are alternately conductive to translate current therethrough to supply the linearly varying scanning current. Whenever the horizontal output tube 16 is turned off, the retrace portion of the scanning cycle is instigated. Due to the sudden breaking of the circuit through the tube 16, a high voltage is induced at the high voltage end T2 of the high voltage transformer HVT. The anode of a high voltage rectifier DH is connected to the terminal T2 and the cathode thereof is connected to the anode of the picture tube 10 so that a DC voltage of a magnitude in the order of 25,000 volts is supplied to the anode of the picture tube 10 as required for the proper operation thereof. Connected between the cathode of the high voltage rectifier DH and ground is a resistive voltage divide network including a resistor R1 and a potentiometer P1. The focusing electrode F of the picture tube 10 is connected to the junction between the resistor R1, the potentiometer P1. By the adjustment of the potentiometer P1 the focusing potential supplied to the focusing electrode F may be adjusted for the proper operation of the picture tube. This voltage may be in the order of 5,000 volts DC.

With the turning off of the horizontal output tube 16 and the resonance effect in the circuitry including boost capacitor C1, a DC voltage is developed at the terminal T3 at the low voltage end of the transformer 12 with respect to ground that is substantially higher than the B+ voltage. This voltage commonly called the boost voltage may be approximately 800 volts as compared to a B+ potential of approximately 280 volts.

FIG. 2 shows the waveform voltage developed across the terminal T3 to ground. The wave shape as shown in FIG. 2 is substantially parabolic with the cusps of the parabola occurring at the flyback interval of the scanning cycle and the peak of the parabola occurring at the center of the scanning interval. By the selection of the value of the boost capacitor C1, the wave shape developed at the terminal T3 may be controlled. As exemplary, the peak-to-peak value for the parabolic waveform as shown in FIG. 2, utilizing the mentioned B+ voltage of 280 volts and the boost value of 800 volts may be 200 volts peak-to-peak. By the selection of the boost capacitor C1 to have different values, the wave shape and magnitude of the peak-to-peak voltage can, of course, be changed.

The circuitry as so far described has comprised standard color television circuitry. However, it should be noted that the high voltage transformer HVT does not include a separate tap point thereon for developing an augmented boost voltage during the flyback portion of the scanning cycle.

In order to develop a high value operating voltage in the circuitry as shown in FIG. 1, a peak detector is provided which includes a detector diode D1 having its anode connected to the low voltage end T3 of the transformer

12 and its cathode connected to one end of a capacitor C2 which has its other end grounded. The diode D1 thus detects the voltage appearing at the terminal T3 with the capacitor C2 acting as the detected boost input filter capacitor. As previously mentioned the voltage appearing at the terminal T3 varies according to the parabola as shown in FIG. 2 approximately 100 volts above the boosted voltage value. Therefore, the voltage appearing at the junction J1 with respect to ground will be approximately 100 volts higher than that at the terminal T3 with respect to ground, or approximately 900 volts DC in the present example. A boosted boost filter network is provided including the input capacitor C2, a resistor R2 and a capacitor C3, with the resistor R2 connected between the junction J1 and a junction J2. The capacitor C3 has one end connected to the junction J2 and the other end grounded. The unfiltered detected boost voltage appearing at the junction J1 is filtered in the filter network and appears as a filtered detected boost voltage at the junction J2 with respect to ground, having a low ripple content and of a suitable magnitude for application to the screen grid control circuit. The screen grid control circuit includes red, green and blue screen grid control potentiometers PR, PG and PB connected in parallel. The tap of each of the potentiometers PR, PG and PB is, respectively, connected to the screen grid electrodes GR, GG and GB. A bypass capacitor CR, CG and CB is, respectively connected between the tap and top end of the parallel connection for each of the potentiometers PR, PG and PB to bypass high frequency signals from the screen grids. A resistor R3 is connected to the bottom end of the parallel connection of the potentiometers PR, PG and PB to the terminal T+ at the B+ potential and acts as a low voltage limiting resistor for the screen grid voltages.

The detected boost generating circuit as described with reference to FIG. 1 thus provides advantages over the augmented boost circuit requiring the use of a tap on the high voltage transformer and producing the boosted boost voltage in response to the pulse being developed across the tap during the flyback interval of the scanning cycle and adding this to the boost parabola. One advantage of course of the circuitry of FIG. 1 is the elimination of the requirement for an additional tap on the high voltage transformer 12. Moreover, in the circuit requiring tap on the high voltage transformer, the input filter capacitor is returned to the boost voltage point; thus, it is necessary to filter the parabolically varying voltage appearing at the boost voltage point at the bottom of the low voltage end of the high voltage transformer. This means that the filter resistor utilized in conjunction with the input filter capacitor must have such magnitude to eliminate ripple due to the parabolic waveform. Therefore, if a 250 volt pulse is developed across the tap with reference to the boost voltage point at the low voltage end of the transformer, 100 volts of this may be lost in filtering to provide a low ripple content boosted boost voltage to the screen grid controls. Furthermore, because the diode connected to the tap conducts only during the peaks of the flyback pulse and then conducts a relatively high current for a short period of time, filtering is required to eliminate peaks and provide a low ripple content boosted boost voltage. On the other hand, the input filter capacitor C2 as shown in FIG. 1 is returned to ground, and the parabolic waveform itself is peak detected in order to supply the boosted boost voltage at the junction J1. Therefore, a relatively small filter resistor R2 may be utilized and still provide a sufficiently low ripple content filtered enhanced boost voltage at the junction J2 to be supplied to the control potentiometers PR, PG and PB. It has been found that a filter network inserting only a 20 volt drop may be effectively utilized as compared to a 100 volt drop required in circuitry utilizing the tap on the high voltage transformer. Also the detector diode D1 in FIG. 1 conducts over a longer period of time and at lower current levels which thereby reduces the need for filtering of high current peaks over short intervals of time and thus aids in the reduction of filtering required to provide a low ripple content boosted boost voltage.

Figures 3, 4:
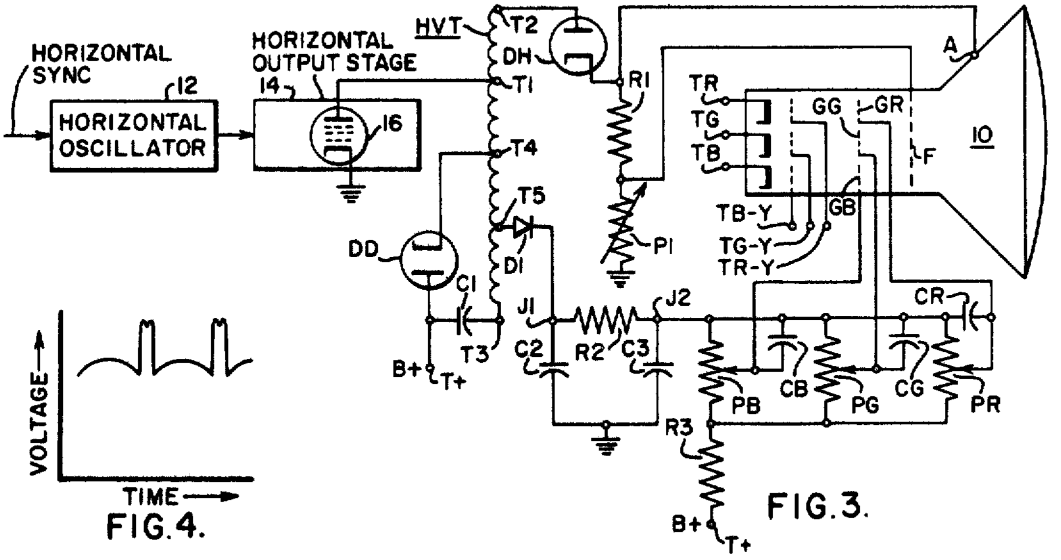
FIG. 3 is a schematic diagram of a second embodiment.
FIG. 4 is a waveform diagram used in explaining the operation of FIG. 3.

FIG. 3 shows another embodiment of the present invention wherein a tap point T5 is utilized on the high voltage transformer HVT which is located on transformer winding between the low voltage end T3 and the tap point T4. The waveform appearing at the point T5 is shown in FIG. 4.

The only difference between the circuitry of FIG. 3 and that of FIG. 1 is that the anode of the diode D5 is connected to the tap point T5 rather than the tap point T3. It should be noted the bottom end of the capacitor C2 remains connected to ground.

As can be seen in FIG. 4, the voltage waveform appearing at the terminal T5 at the anode of the diode D1 has a parabolic component appearing during the trace portion of the horizontal scanning cycle and a flyback pulse appearing during the retrace portion of the scanning cycle. The magnitude of the flyback pulse may for example be approximately 100 volts higher than the peak value of the parabolic voltage. Thus, the circuit as shown in FIG. 3 may be advantageously utilized whenever it is necessary that a somewhat higher operating potential be supplied to the control potentiometers or other circuitry of the color television receiver.

The operation of the circuitry of FIG. 3 is such that the flyback pulses of the waveform as shown in FIG. 4 are peak detected by the diode D1 and the capacitor C2 so that a voltage is developed across the capacitor C2 which is substantially at the peak value of the flyback pulses. This voltage is then filtered in the resistor R2 and capacitor C3 to provide a substantially low ripple content operating voltage which may be utilized for supplying the screen grid control potentiometers. Since the capacitor C2 is returned to ground, no parabolic wave shape appears at the juction J1 at the cathode of the diode D1, and, therefore, this wave shape need not be filtered in the resistor R2 as would otherwise be required if the capacitor C2 were returned to the low voltage end T3 of the high voltage transformer HVT. In that a parabolic component does not appear at the input to the filter network including the capacitors C2, C3 and the resistor R2, it is permissible to use the same resistive value for R2 in FIG. 3 as that used in FIG. 1 and still provide a low ripple content DC voltage which will be of a somewhat higher value as determined by the peak magnitude of the flyback pulse appearing at the terminal T5.

Typical values which may be utilized in the filter network for both the embodiments of FIG. 1 and FIG. 3 are resistor R2—18 kilohms, and capacitors C2 and C3—.01 microfarad. If the grounded end of the capacitor C2 were returned to the low voltage end T3 of the high voltage amplifier it would be necessary to use a valve for the resistor R2 of a much higher value (in the order of five times as large) to supply an output voltage of an equivalent ripple content. Thus, by connecting the capacitor C2 to ground, the parabolic waveform is eliminated from being applied to the filter circuit and therefore it is not required to be filtered out. The losses in the filter circuit are thus minimized while still maintaining a low value of ripple content in the enhanced voltage appearing at the output of the filter network.

Although the present invention has been described with a certain degree of particularity, it should be understood that the present disclosure has been made only by way of example and that numerous changes in the details of circuitry and in the combination and arrangement of parts, elements and components can be resorted to without departing from the spirit and scope of the present invention.

I claim as my invention:

1. In a television receiver including a color picture tube having a plurality of screen grid electrodes therein and control means for adjusting the potential applied respectively to said plurality of screen grid electrodes, a deflection wave source and a direct operating voltage source, the combination of:

a transformer including an input terminal, a high voltage terminal, a low voltage terminal and an intermediate terminal;

means for applying the output of said deflection wave source to said input terminal, a high voltage output being developed at said high voltage terminal;

a damper rectifying device connected between said direct operating voltage source and said intermediate terminal;

a first capacitor connected between said direct operating voltage source and said low voltage terminal with a boost voltage being developed at said low voltage terminal having a higher magnitude than the direct operating voltage;

a detector circuit including a detector rectifying device and a second capacitor, said detector rectifying device being connected between a point on said transformer and one end of said second capacitor, the other end of said second capacitor being connected at a fixed reference voltage level, an enhanced detected boost voltage being developed in said detector circuit having a higher magnitude than said boost voltage; and means for applying said enhanced detected boost voltage to said control means.

2. The combination of claim 1 wherein:

said point on said transformer comprises said low voltage terminal.

3. The combination of claim 1, wherein:

said enhanced detected boost voltage is developed at the junction of said detector rectifying device and said second capacitor, said means for applying includes filter means connected to said junction for filtering said enhanced detected boost voltage and provide a filtered enhanced boost voltage for application to said control means.

4. The combination of claim 3 wherein:

said control means includes a plurality of potentiometers each including an adjustable tap thereof and being operatively connected in parallel, with said filtered enhanced boost voltage being applied to one end of said potentiometers, the other end of said potentiometers being operatively connected to said direct operating voltage source, the tap of each of said potentiometers being respectively connected to said screen grid electrodes.

5. The combination of claim 4 wherein:

said filter means includes a resistor connected in series between said junction and said one end of said potentiometers and a third capacitor connected between said one end and said reference voltage level.

6. The combination of claim 1 wherein:

said transformer includes a take off terminal disposed between said intermediate terminal and said low voltage terminal, said point on said transformer comprises said take off terminal.

7. The combination of claim 6 wherein:

said enhanced boost voltage is developed at the junction of said detector rectifying device and said second capacitor, said means for applying includes filter means connected to said junction for filtering said enhanced detected boost voltage and providing a filtered enhanced boost voltage, said detector rectifying device comprises a diode having its anode electrode connected to said take off terminal and its cathode electrode connected to said junction, said second capacitor being connected between said junction and said reference voltage level.

(References on following page)

References Cited

UNITED STATES PATENTS

| | | | |
|---|---|---|---|
| 2,785,336 | 3/1957 | Konkel et al. | 315—27 X |
| 2,905,853 | 9/1959 | Preisig et al. | 315—27 X |
| 2,867,750 | 1/1959 | Vonderschmitt | 315—27 X |
| 2,877,300 | 3/1959 | Court. | |
| 2,905,857 | 9/1959 | Nelson | 317—27 |
| 3,201,642 | 8/1965 | Stark | 315—27 |

RODNEY D. BENNETT, Jr., Primary Examiner

BRIAN F. RIBANDO, Assistant Examiner